(No Model.) 2 Sheets—Sheet 2.

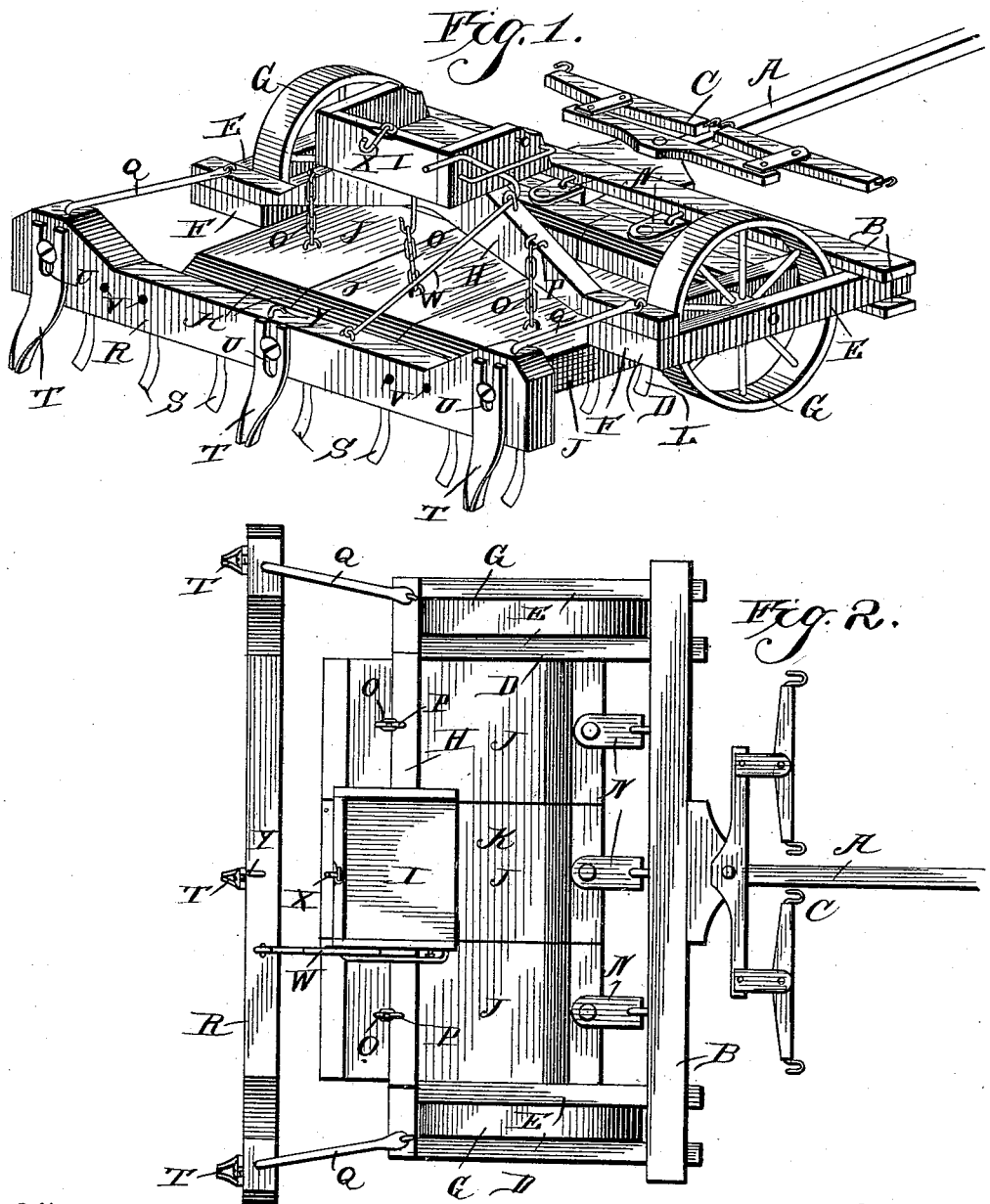

L. B. PHELPS.
HARROW AND CLOD CRUSHER.

No. 407,791. Patented July 30, 1889.

Witnesses
Henry G. Dieterich
R. W. Bishop.

Inventor
Lucius B. Phelps,
By his Attorneys

UNITED STATES PATENT OFFICE.

LUCIUS B. PHELPS, OF EAGLEVILLE, OHIO.

HARROW AND CLOD-CRUSHER.

SPECIFICATION forming part of Letters Patent No. 407,791, dated July 30, 1889.

Application filed January 29, 1889. Serial No. 297,976. (No model.)

*To all whom it may concern:*

Be it known that I, LUCIUS B. PHELPS, a citizen of the United States, residing at Eagleville, in the county of Ashtabula and State of Ohio, have invented new and useful Improvements in Combined Harrow and Clod-Crusher, of which the following is a specification.

My invention relates to improvements in harrows and clod-crushers; and it consists in certain novel features, hereinafter described and claimed.

Figure 3:
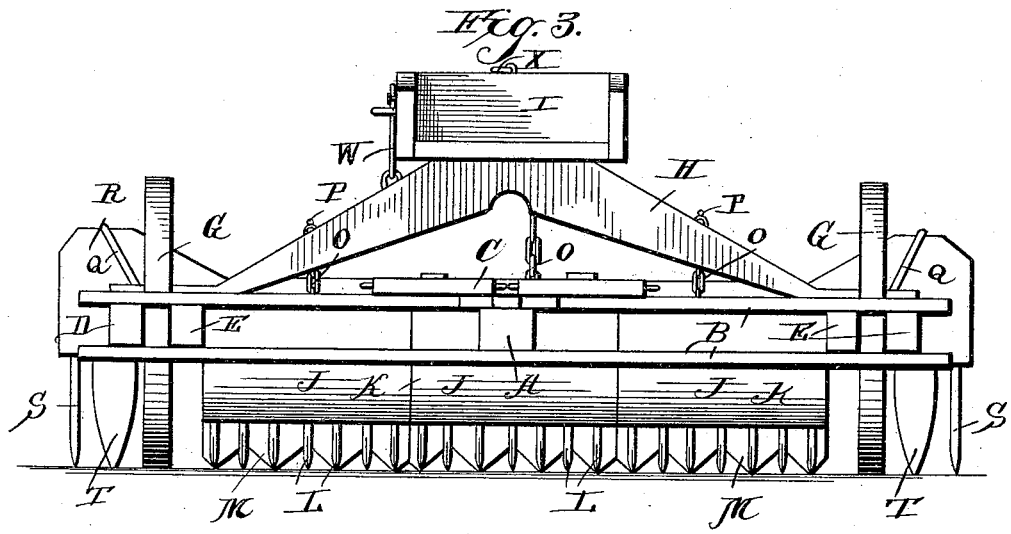
Figure 4:
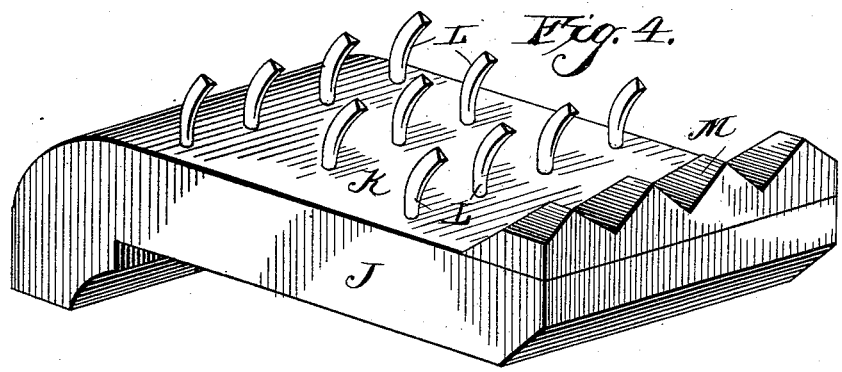
Figure 5:
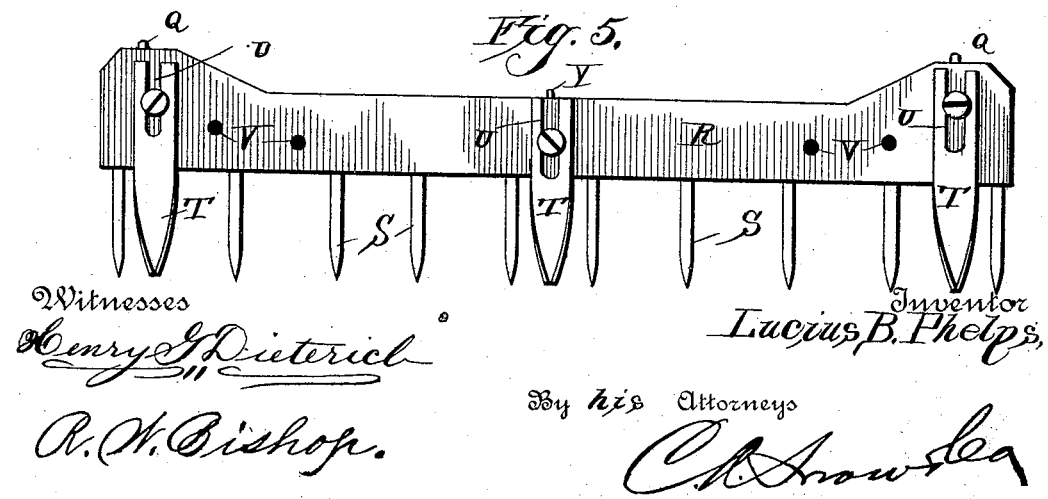

In the accompanying drawings, Figure 1 is a perspective view of my improved device. Fig. 2 is a plan view of the same. Fig. 3 is a front elevation. Fig. 4 is a detail perspective view of one of the clod-crusher sections, looking at the under side of the same; and Fig. 5 is a detail view of the harrow and marker.

Referring to the drawings by letter, A designates the tongue, the rear end of which is secured between the parallel transverse bars B B, and to which the whiffletrees C are attached, as shown. At the ends of the bars B, I secure the rearwardly-extending frames D, which consist of the parallel side bars E, and the cross-bar F, connecting the rear ends of said side bars. The carrying-wheels G are journaled in these side bars and arranged between the same, as shown. An arch-bar H has its ends secured to the cross-bars F, and extends between the same, as shown, and the driver's seat I is secured upon this bar at the center of the same.

The clod-crusher is composed of a series of sections J, which are arranged between the frames D and are connected to the front cross-bars B. Each of these sections is composed of a block or plate K, the teeth L depending from the under side of the said block and the pulverizing-bar M, secured to the under side of said block at the rear end of the same. The sections are connected to the bars B by the links N, having their front ends pivoted to the said bars B and their rear ends pivoted to the front ends of this section. The sections of the clod-crusher are further provided, near their rear ends, with the chains O, which are secured to the upper sides of the sections and are adapted to engage hooks P on the upper side of the arched bar H, so as to support the sections of the clod-crusher at the desired height, so that the teeth will cut into the ground to a greater or less depth.

At the ends of the arched bar H, on the upper side of the same, I pivotally secure the front ends of the supporting-arms Q, which extend rearwardly and have the harrow-bar R secured to their rear ends and extending between the same. The said harrow-bar is provided in its under side with the depending harrow-teeth S, as shown, and the markers T are secured to the rear side of the said bar. The said markers T consist each of a metallic plate, having its lower end bent to form a blunt point and having its upper end provided with longitudinal slots or notches U, through which securing-bolts are passed into the harrow-bar, so as to secure the markers to the said bar at the proper height. The said harrow-bar is further provided, in its rear side, with a number of bolt-holes V, so that the end markers can be adjusted to or away from the central marker, according to the distance desired between the rows.

W designates a lever, which is fulcrumed on the bar H, and has its rear end pivoted to the harrow-bar R and has its front end arranged within convenient reach of the driver and adapted to engage a suitable stop on the side of the driver's seat. This lever is intended to be used to raise the harrow-bar when moving the device from field to field, and in order that the weight of the said bar, when raised, will not be entirely thrown on the said lever, I provide the hook X, which is pivoted on the driver's seat and is adapted to engage a staple Y in the upper side of the harrow-bar.

In practice the device is drawn over the field, and the clods will be thoroughly broken up and crushed by the teeth L and the pulverizing-bars M. The harrow-teeth carried by the harrow-bar will act on the surface of the ground, so as to even the same, and the markers will be drawn along so as to leave small furrows, indicating the lines upon which the rows are to be planted.

It will be observed that my device is very simple and is compactly arranged, and its efficiency is thought to be obvious.

By the use of my device the ground will be thoroughly broken up and pulverized and put in the best possible condition for planting. The clod-crusher being made in independent sections will readily ride over large stones and other obstructions, so that breaking of the said sections is obviated. The harrow-bar also can readily rise so as to clear obstructions, as the supporting-arms are pivoted at their front ends. When it is desired to move the device from one field to another, the clod-crusher sections and the harrow-bar are both raised so as to clear the ground, as will be readily understood. The sections of the clod-crusher are supported by the chains O and the harrow-bar is supported by the hook X.

Having thus described my invention, what I claim, and desire to secure by Letters Patent, is—

1. The combination of the frame, the clod-crusher sections arranged side by side and having their front ends loosely connected with the frame, and the harrow-bar connected to the frame in rear of the clod-crusher sections, as set forth.

2. The combination of the frame, the clod-crusher sections loosely connected thereto, the harrow-bar loosely connected to the frame in rear of the clod-crusher sections, and the markers carried by the harrow-bar and adjustable both vertically and longitudinally thereon, as set forth.

3. The combination of the frame, the arched bar secured to the rear portion of the same, the clod-crusher sections having their front ends loosely connected with the frame, and the chains secured to the rear portions of said sections and adapted to suspend the same from the said arched bar, as set forth.

4. The combination, with the frame, of the clod-crusher sections having the teeth L and the pulverizing-bar M, and the links N, having their front ends pivoted to the frame and their rear ends pivoted to the clod-crusher sections, as set forth.

5. The combination, with the harrow-bar having a longitudinal series of bolt-holes, of the markers having longitudinal slots or notches in their upper portions, and the securing-bolts passed through said slots or notches into one of the bolt-holes in the harrow-bar, as set forth.

In testimony that I claim the foregoing as my own I have hereto affixed my signature in presence of two witnesses.

LUCIUS B. PHELPS.

Witnesses:
L. W. PECK,
C. D. KING.